United States Patent Office 3,798,324
Patented Mar. 19, 1974

3,798,324
METHOD FOR CONTROLLING TREMOR SYMPTOMATIC OF PARKINSONISM UTILIZING 1-(2-PYRIDYL) PIPERAZINE
Rodolfo Rodriguez, Mexico City, Mexico, assignor to Miles Laboratories, Inc., Elkhart, Ind.
No Drawing. Filed Dec. 21, 1972, Ser. No. 317,112
Int. Cl. A61k 27/00
U.S. Cl. 424—250       4 Claims

ABSTRACT OF THE DISCLOSURE

Administration of an effective amount of 1-(2-pyridyl) piperazine or a nontoxic acid addition salt thereof controls tremor symptomatic of parkinsonism in mammals. Daily doses ranging from 10 mg./kg. to 90 mg./kg. are considered effective.

BACKGROUND OF THE INVENTION

Field of the invention

Parkinsonism, also referred to as Parkinson's Disease or Parkinson's Syndrome, is a clinical entity of diverse etiology, associated with a variety of pathological processes which involve the extrapyramidal system. In any case, the primary symptom is involuntary tremor. Although the tremor of parkinsonism can be alleviated by neurosurgery, it is most often controlled by chemotherapy. Disclosed herein is a chemotherapeutic method of managing parkinsonism by the administration of 1-(2-pyridyl)piperazine.

Description of the prior art

The following drugs, not related to the compound utilized in the disclosed method, are used in the chemotherapy of parkinsonism to control tremor: anticholinergic agents such as trihexyphenidyl, biperiden, cycrimine, procyclidine, ethopropazine, and benztropine mesylate; antihistaminic compounds such as diphenhydramine, chlorphenoxamine, and orphenadrine; and certain belladonna alkaloids, notably atropine and scopolamine. Although these drugs exhibit low toxicity and suppress tremor, only partial control is possible, and high doses are required. At high doses, however, these compounds produce untoward side effects which include dryness of the mouth, blurred vision, constipation, urinary retention, photophobia and tachycardia. Refer to: Esplin, Don W., "Centrally Acting Muscle Relaxants; Drugs for Parkinson's Disease," in The Pharmacological Basis of Therapeutics, 4th edition, L. S. Goodman and A. Gilman, editors, New York, Macmillan, 1970, Chapter 14, pp. 229 to 235.

In recent years, (-)3-(3,4-dihydroxyphenyl)-L-alanine, also known as L-dopa or levodopa, has been utilized to control the tremor of parkinsonism. In order to obtain optimum results, however, levodopa must be administered in very high doses at which it causes undesirable side effects. Among the latter are: nausea, anorexia, emesis, cardiac irregularities, or orthostatic hypotension, choreiform movements, dizziness, sedation, dyskinesia and unpleasant psychiatric symptoms. For details, see Esplin, referenced above, and Physician's Desk Reference, 25th edition, Oradell (N.J.), Medical Economics, Inc., 1970, pp. 692–694 and 1103–1104.

The synthesis of 1-(2-pyridyl)piperazine is described by Hamlin et al. in J. Am. Chem. Soc., 71: 2731-2734 (1949) and by Howard et al. in J. Org. Chem., 18: 1484–1488 (1953). In the publication by Howard, 1-(2-pyridyl) piperazine was reported to have no analgesic or antifilarial activity. Although L. W. Roth in J. Pharmac. Exp. Ther., 110: 157–165 (1954) reported the pharmacological activity of a series of substituted piperazines, 1-(2-pyridyl)piperazine was not tested. 1-(2-pyridyl)piperazine is represented by the following structural formula:

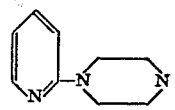

SUMMARY OF THE INVENTION

The essential feature of this discovery is the ability of 1-(2-pyridyl)piperazine (hereinafter called compound A for convenience) to suppress tremor symptomatic of parkinsonism of extrapyramidal origin. Administration of an effective amount of compound A controls tremors of experimentally induced parkinsonism in mice. Nontoxic acid addition salts of compound A are also active. Compared to certain known anti-parkinsonism drugs, lower doses of compound A are required to check severe tremor.

Doses of compound A can range from 10 mg./kg. to 90 mg./kg. daily, depending on the severity of tremor.

Dose forms of compound A may be conveniently prepared by the addition of pharmaceutically acceptable vehicles generally used in formulations. Dose forms can be prepared in a solid or liquid state by methods known in the art for oral, intravenous, parenteral, intramusclar, and subcutaneous administration.

DESCRIPTION OF THE PREFERRED EMBODIMENTS

Suppression of tremor symptomatic of Parkinsonism by administration of 1-(2-pyridyl)piperazine Suppression of tremor symptomatic of parkinsonism is achieved by administering 1-(2-pyridyl)piperazine (Compound A) to mice in which experimental parkinsonism was induced by tremorine. Tremorine is 1,1'-(2-butynylene)dipyrrolidine and may be synthesized according to the method by Biel and Dipierro in J. Am. Chem. Soc. 80:4609 (1958). Utilization of tremorine to produce experimental parkinsonism has been reported by Everett et al. in Science, 124:79 (1956).

The activity of Compound A was compared to known reference compounds atropine sulfate, trihexyphenidyl hydrochloride, and levodopa. Graded doses of these compounds were administered orally to groups of 10 mice 15 minutes before intraperitoneal injection of tremorine at a dose of 20 mg./kg. which causes severe tremor in unprotected mice. Tremor was determined 30 minutes after administration of tremorine. Animals which did not show tremor of the head during a 1 minute observation period were considered protected. The proportion of mice protected at each dose level of Compound A and the reference compounds was used to estimate the $ED_{50}$ (median effective dose) and the $CL_{95}$ (confidence limits for 95% protection) of the respective compounds. The results are tabulated in Table I.

TABLE I

| Compound | $ED_{50}$ (mg./kg., p.o.) | $CL_{95}$ (mg./kg., p.o.) | N (number of mice) |
|---|---|---|---|
| Compound A | 2.6 | 1.4– 4.9 | 60 |
| Atropine | 8.4 | 5.6–12.6 | 50 |
| Trihexyphenidyl | 7.0 | 4.2–11.5 | 50 |
| Levodopa | 375.0 | 279.8–502.5 | 50 |

Because the pharmacological effects of tremorine can be completely prevented by compounds which merely inhibit its biotransformation to oxotremorine, the active metabolite, the antitremor activity of Compound A was also assessed using oxotremorine. This test was performed essentially as described above, except for the fact that oxotremorine (1 mg./kg., I.P.) was injected 30 min. after oral administration of the test drug, and evaluation of tremor was carried out 15 min. after injection of the tremorigenic substance. Compound A antagonized oxotremorine-induced tremor in a dose-response fashion. The $ED_{50}$ and 95% confidence limits for Compound A were 3.0(1.3–7.2) mg./kg.

The $LD_{50}$ of Compound A in mice is 147 mg./kg.

What is claimed is:

1. A method of suppressing tremor symptomatic of parkinsonism which comprises:
   administering to a mammal having said tremor an effective amount of a compound selected from the group consisting essentially of 1-(2-pyridyl)-piperazine and a pharmaceutically acceptable acid addition salt thereof.

2. A method as in claim 1 wherein said compound is 1-(2-pyridyl)piperazine dihydrochloride.

3. A method as in claim 1 wherein said amount ranges from 10 mg./kg. to 90 mg./kg. daily.

4. A method as in claim 1 wherein said compound is administered orally.

References Cited

UNITED STATES PATENTS

| | | | |
|---|---|---|---|
| 2,606,906 | 8/1952 | Hultquist | 200—268 |
| 2,958,694 | 11/1960 | Janssen | 424—250 |

STANLEY I. FRIEDMAN, Primary Examiner